United States Patent [19]

Brennan et al.

[11] Patent Number: 4,509,795
[45] Date of Patent: Apr. 9, 1985

[54] SELF-DEPLOYING LEGREST ASSEMBLY

[75] Inventors: Edward J. Brennan, Litchfield; John H. Pratt, Jr., Bethlehem, both of Conn.

[73] Assignee: PTC Aerospace Inc., Bantam, Conn.

[21] Appl. No.: 416,393

[22] Filed: Sep. 9, 1982

[51] Int. Cl.³ .............................................. A47C 7/50
[52] U.S. Cl. .................................... 297/434; 297/436
[58] Field of Search ...................... 297/68, 69, 70, 71, 297/431, 433, 434, 435, 436, 432, 429

[56] References Cited

U.S. PATENT DOCUMENTS

| 586,610 | 7/1897 | Lee | 297/436 X |
|---|---|---|---|
| 1,689,024 | 10/1928 | Hamilton et al. | 297/435 |
| 2,174,622 | 10/1939 | Dale | 297/432 |
| 2,559,127 | 7/1951 | Lyon | 297/434 |
| 2,696,868 | 12/1954 | Miller | 297/69 |
| 2,918,964 | 12/1959 | Braun | 297/435 X |
| 4,264,103 | 4/1981 | Peresada et al. | 297/436 X |
| 4,410,215 | 10/1983 | McKean | 297/431 X |

Primary Examiner—William E. Lyddane
Assistant Examiner—Peter A. Aschenbrenner
Attorney, Agent, or Firm—James R. Hoatson, Jr.; Barry L. Clark; William H. Page, II

[57] ABSTRACT

Legrest assembly for a passenger seat is pivotally mounted to the seat frame with a spring-loaded hydraulic lock mechanism which automatically lifts a leg or foot support panel to its generally horizontal use position when a control button on the armrest is actuated. The panel is pivotally moved to its storage position under the front edge of the seat cushion when the occupant forces it down with pressure from his or her legs against the upward biasing force exerted by its spring while actuating the control button on the armrest. For maximum comfort, the legrest pad is slidable through a range of fore and aft locations in its use position and can also be locked at any angle in its range of pivotal movement. A series of interconnected links cooperate with one another and with the seat frame in such a manner so as to substantially eliminate encroachment into the normal underseat storage area. A resettable mechanism prevents damage to the assembly from excessive downward loads on the suspended legrest pad.

9 Claims, 5 Drawing Figures

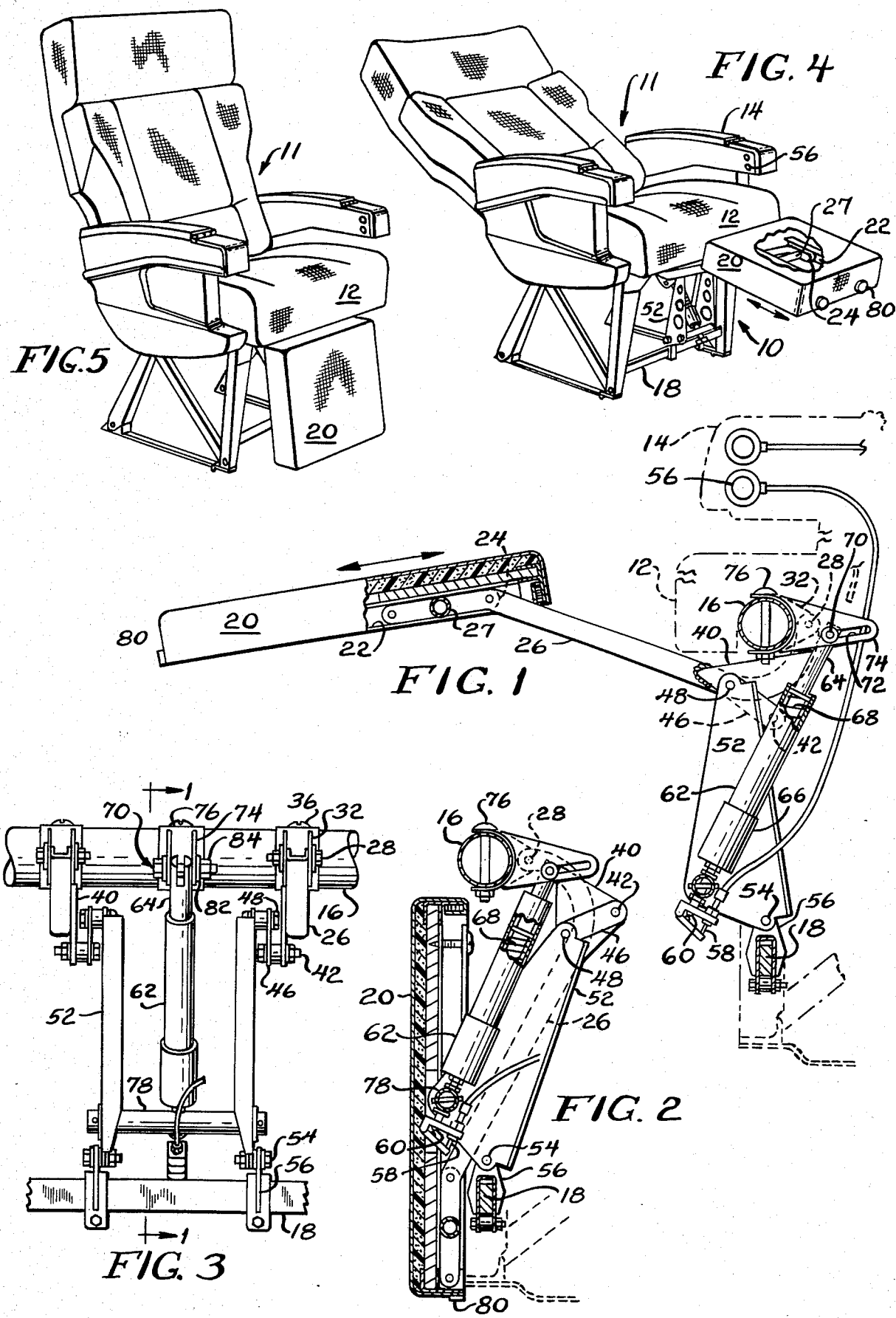

SELF-DEPLOYING LEGREST ASSEMBLY

BACKGROUND OF THE INVENTION

The invention relates to legrests and particularly to legrests which are suitable for attachment to aircraft seats. Typically, such legrests are moved to their extended operating position by manually lifting them from their storage position and unfolding legs which mount the legrest at a fixed position above the floor. With many designs, the assistance of a flight attendant is often necessary, thus restricting the passenger's freedom to use or not to use the legrest at will. The design shown in U.S. Pat. No. 4,264,103 can be easily manipulated by the user but still requires considerable bending effort on the part of the user and has several hinged members which must be unfolded. Various self-deployed legrest concepts are schematically disclosed in U.S. Pat. No. 2,918,964. However, the required linkages extend over the major portion of the fore and aft space under the seat and would interfere with underseat storage. The mechanisms also have a very limited number of adjustment positions and would seem to require that the locking mechanism and linkages be fixedly mounted on the seat frame or arms, thus making operation somewhat difficult and making the design incompatible with existing seats. Where the structure is mounted in the seat armrest, the armrest would have to be fixed whereas on many aircraft seats the arms are pivotable to a storage position or can be lifted out of retaining sockets when their presence is not desired. The legrest also appears to be quite heavy since heavy torque loads which could be applied to either side during use would seem to require duplicate linkages on each side and interconnecting supports. The legrest apparently has an extension portion, but how it would be fabricated has not been explained. In some disclosed embodiments the extension is spring-loaded to an extreme position and thus could not be adjusted for user comfort.

SUMMARY OF THE INVENTION

It is among the objects of the present invention to provide a legrest for a vehicle seat which automatically deploys itself when a pushbutton on the armrest is depressed; which can be positioned at an infinite number of comfort angles in between its highest, generally horizontal use position and its lowest, generally vertical storage position; which operates smoothly and quietly; which has a considerable amount of fore and aft comfort adjustment capability for the legrest pad; which can be stored vertically under the front of the seat when a downward pressure is exerted on the legrest pad by the occupant as the pushbutton is depressed; which can pivot downwardly when overloaded; and which has a support linkage which is so compact that only a very small amount of the space underneath the extreme front portion of the seat is consumed by it. The foregoing and other objects and advantages are attained by the legrest of the present invention which is designed to be mounted between the tubular front stretcher tube and the baggage restraint bar of existing seats.

The legrest assembly is mounted by a support linkage between a first spaced pair of apertured brackets attached to the upper front stretcher tube under the seat bottom cushion and a second spaced pair of apertured brackets attached to the baggage restraint bar. The first brackets each have an aperture at a fixed location behind the stretcher tube which forms a fixed pivot for the curved ends of a pair of generally J-shaped arms. The arms have slide blocks at their outer ends which slide in a pair of spaced parallel slide rails mounted under a legrest support panel. The slide blocks and rails permit the legrest panel, when in its deployed position, to be adjusted to an infinite number of positions of spacing relative to the seat bottom cushion to accommodate various lengths of passenger legs or to allow the passenger to vary the support location at intervals during a long flight. The J-shaped arms are each attached to one end of a short floating pivot link which is attached at its other end to the upper end of a long link. The long links are triangular in shape and are pivoted near the lower rear corner of their relatively wide base to said second bracket. A second lower forward corner of the base of each of the long links is pivoted to a cross-bar which is attached to one end of an extensible cylinder which includes a compression biasing spring and a hydraulic locking cylinder such as the Model HL13500-01X sold by P. L. Porter Co. under the trademark "Hydrolok" for use in pushbutton controlled recline mechanisms for the backs of aircraft seats. The upper or rod end of the locking cylinder is pivotally mounted to a third apertured bracket which is positioned on the upper stretcher tube intermediate the aforementioned first pair of brackets. In operation, to deploy the legrest, the seat occupant depresses the legrest control pushbutton which is conveniently located in an armrest and connected by a flexible cable to the lock cylinder. This action depresses a control valve on the lower end of the cylinder and allows fluid in the cylinder, which normally locks the cylinder, to move freely so that the cylinder's spring can force the ends of the cylinder apart. This latter action pivots the long links about their lower rear pivot and causes them to pull the short links and the J-shaped arms attached thereto until the latter are raised to their highest use position. Naturally, the occupant's legs must be raised to allow this movement to take place. The legrest panel will automatically slide forward due to gravitational forces as it is lifted. However, once deployed, friction will hold it in any position which the occupant may desire in order to achieve comfort. If the panel is at too high an angle to be comfortable, the occupant can depress it against the bias of the cylinder spring through an infinite angular adjustment range as the pushbutton is engaged and the panel will be positively locked at any desired height as soon as the button is released. To again store the legrest panel under the front cushion overhang of the seat, the occupant, while depressing the control button, uses his or her legs to force the panel down to its vertical storage position. This action reloads the spring. To prevent damage to the support linkage when excessive loads are applied to the legrest panel, the apertures in the aforementioned third bracket are preferably elongated slots in a pair of spaced plates and the lock cylinder has the shaft at its upper end frictionally mounted between the plates by a torqued nut and bolt assembly which frictionally engages the sides of the slots. In ordinary use, the cylinder would always pivot about its mounting bolt in the forward end of the slot. However, if a downward load in excess of about 75 pounds is applied to the legrest panel, such as by someone trying to stand on it, the torqued nut and bolt assembly and the upper end of the cylinder assembly will move rearwardly in the aperture and thus permit the legrest panel to move downwardly without damage to its mounting structure. Once the overload condition is removed, the legrest can be manually lifted with a force greater than the friction force of the nut and bolt assembly on the third bracket to return the latter assembly to its normal location at the bottom of the slot.

BRIEF DESCRIPTION OF THE DRAWINGS

FIG. 1 is a section view taken on line 1—1 of FIG. 3 showing the legrest in its fully deployed position;

FIG. 2 is a section view taken in the same plane as FIG. 1 but with the legrest in its stored position;

FIG. 3 is a rear view of the legrest assembly;

FIG. 4 is a perspective view of a seat showing the legrest in its fully deployed position; and FIG. 5 is a perspective view of a seat showing the legrest in its storage position.

DESCRIPTION OF THE PREFERRED EMBODIMENT

The mounting structure for the legrest assembly indicated generally at 10 is shown in detail in FIGS. 1-3. FIGS. 4 and 5 illustrate the relationship between the legrest assembly and a seat to which it may be attached in its fully extended use position and in its vertical storage position, respectively.

Referring to FIG. 1, the assembly 10 is shown in its fully deployed, generally horizontal position relative to a conventional seat 11 which has a bottom cushion 12, an armrest 14, an upper tubular stretcher tube member 16 and a lower baggage restraint bar 18. The legrest has a cushioned pad or panel member 20 which includes integral, fore and aft, parallel, spaced slide channels or rails 22 which accommodate pairs of slide blocks 24 mounted at the outer ends of a pair of legrest support arms 26. The pad or panel 20 can be moved fore and aft to the ends of the slide channels to provide the occupant with an infinite number of fore and aft comfort positions which will be retained by friction. The arms 26 are joined by a cross-bar 27 and are formed of lightweight tubular material such as aluminum and are pivoted to the seat frame about bolts 28 which pass through apertures in brackets 32 which are fixed to the stretcher tube 16 by bolt assembly 36. The inner ends of the arms 26 are curved to clear around the tube 16 and are reinforced in their curved areas by welded plates 40 which include an aperture in which pivot bolt 42 is mounted so as to support one end of a short pivot link 46. The other end of the pivot link 46 pivots about bolt 48 which is also pivotally mounted in an aperture at the top of the elongated triangular link 52. The link 52 has a relatively wide base which is apertured at its lower rear corner so that it can pivot about fixed bolt 54 which is mounted on a bracket 56 attached to the seat's baggage restraint bar 18. The aforementioned linkage members 46 and 52, by virtue of their connections to the arms 26 and baggage bar 18, will move in a predetermined path as the legrest assembly is moved from its FIG. 2 storage position to its FIG. 1 deployed position. Movement of the legrest assembly to its FIG. 1 position is caused to take place when a pushbutton 56 on the seat arm 14 is depressed so as to retract control cable 58 and thereby depress valve button 60 on the lower end of the hydraulic lock cylinder 62. When the valve 60 is depressed, the rod portion 64 of the cylinder is hydraulically disconnected from its normally locked relationship with the tubular outer body portion 66 of the cylinder. Once unlocked, an internal compression spring 68 will force the body portion 66 downwardly relative to the rod 64, thereby increasing the overall length of the cylinder 62. The upper end of the rod 64 is normally fixedly positioned relative to the seat by a bolt assembly 70 mounted at the forward end of a slot 72 in bracket 74 while the bracket 74 is affixed to frame tube 16 by bolt assembly 76. Thus, when the cylinder 62 becomes longer, its lower end, which is mounted by a cross-bar 78 to an aperture in the forward, lower corner of links 52, will pivot the links 52 counterclockwise about bolts 54. This movement of links 52 and the upper bolt assemblies 48 mounted on them will pull the short links 46 forwardly and cause the arms 26 mounted to the links 46 by bolts 42 to be lifted clockwise about their pivot bolts 28 to the generally horizontal use position shown in FIG. 1. If the pushbutton 56 is released at this point, the panel 20 will remain in its uppermost position. If the occupant prefers a lower position for better comfort, the button 56 need merely be pressed to release the cylinder lock while the panel 20 is depressed to the desired position. To move the panel to its vertical FIG. 2 storage position, the panel 20 is merely forced down by the user's legs while depressing the lock release button 56. This will cause the spring 68 to be compressed and ready for the next lifting operation. If desired, the panel may first be slid rearwardly. However, a pair of nylon glides 80 on the front of the panel permit the panel to easily slide along the carpet if it is lowered to the floor without first being retracted relative to the arms 26.

To prevent damage to the legrest assembly, to the seat or to the various linkage members therebetween from the application of a large overload to the panel 20, it is desirable to provide a means to provide relief from the overload. For example, it might be desirable to construct the assembly to be heavy enough to withstand a 75 pound load on the legrest but not to support the weight of a person standing on it. This can be accomplished by providing the elongated slot 72 in the bracket 74 rather than having just a circular aperture to accept the bolt assembly 70 which mounts the cylinder rod 64 to the bracket. The bolt assembly 70 includes washers 82 and a nut 84 which can be torqued to a predetermined value which will permit the bolt assembly to overcome its friction engagement with the forward end of the slot 72 when a predetermined downward load is applied to the panel 20 in its FIG. 1 position. Thus, an overload will cause the extended panel 20 and arms 26 to pivot downwardly until the panel touches the aircraft floor. This movement produced by an overload when the cylinder 62 is locked will cause the extended length cylinder 62 to have its lower end lifted by link 52. The bolt assembly 70 at the upper end of the cylinder will then slide to the rear of slot 72. When it is desired to reset the position of the assembly so that the bolt assembly 70 is in its normal fixed position at the front of slot 72, it is merely necessary to lift the legrest to its FIG. 1 position with enough force to overcome the frictional grip of the bolt assembly 70 on the slot 72.

The extensible cylinder 62 has been shown and described as including a hydraulic locking mechanism and a compression spring. It would, however, be within the scope of the present invention to utilize alternative types of springs and locks. For example, a tension rather than a compression spring could be used or the spring bias could be provided by a compressed gas rather than by a mechanical spring. The cylinder rod could, alternatively, be locked by a clutching mechanism such as a torsional locking spring or a frictional brake pad.

Although not shown, it would usually be desirable and/or necessary, where the baggage bar 18 is of relatively light construction, to provide a pair of tension straps between the baggage bar and the front stretcher tube 16 or other upper frame member in order to resist downward deflection of the baggage bar by either the force of the spring in the cylinder 62 or by the weight of the occupant's legs on the panel 20. Such straps could connect to bolts 28 and 54, for example.

Although not clearly visible in the drawings, the pairs of slide rails 22 may be mounted by screws to the bottom of the panel 20 in several alternative locations such as a centered location or locations to the left or right of center. When the front seat legs or other structure does not interfere with the positioning of the arms 26 under the center of the seat cushion 12, the rails 22 would be centered in the panel 20. However, in double or triple seats, for example, the front legs are often at varying locations due to variations in seat tracks and could be directly under a particular seat, thus requiring that the mechanism 10 be offset from center. Such an offset would cause no problem since the rails 22 would simply be mounted in a corresponding offset location on the panel 20 so that the panel would end up centered in front of the seat cushion.

From the preceding description it will be appreciated that the legrest assembly of the invention has numerous advantages over the legrests previously used in aircraft which have only one deployed position due to the fact that they must rest on legs. The principal advantages are of course ease of operation and the ability to achieve an infinite amount of both fore and aft and angular comfort adjustments within a predetermined movement range. An additional advantage of the fact that the legrest is so easily controlled by a pushbutton and leg pressure is that there would be a minimum of inconvenience in lowering the panel to allow a passenger in an adjacent seat to pass by.

Further advantages to an airline would be the ease with which the feature can be added to existing seats and the fact that the legrest could be used on seats at somewhat closer pitches than normally used with legrests since passengers with longer legs could tilt the legrest down enough so their feet would fit under the seat in front of them.

We claim as our invention:

1. A self-deploying legrest assembly for a vehicle seat comprising a cushioned legrest panel member; said seat having a seat frame including an upper transverse tubular front stretcher member, said panel member being supported for movement between a vertical storage position and a generally horizontal use position by a pair of elongated support arms which are pivotally mounted underneath the bottom cushion of the seat to said tubular stretcher member by a pivotable linkage means; cooperating slide means on said panel member and on said pair of support arms for mounting and permitting fore and aft movement of said legrest panel member relative to said bottom seat cushion of said vehicle seat; said pivotable linkage means including at least one member attached to a lower forward portion of the seat frame and at least one other member attached to said support arms; an extensible cylinder incorporating a spring biasing means, said cylinder being connected to one of the members of said pivotable linkage means and to said seat frame for normally urging said pair of support arms and the legrest panel carried thereby to their uppermost generally horizontal position; locking means for maintaining said extensible cylinder at any selected point in its movement range and manually actuated control means for momentarily releasing said locking means.

2. A legrest assembly in accordance with claim 1 wherein said spring biasing means comprises a compression spring.

3. A legrest assembly in accordance with claim 1 wherein said seat frame further includes a baggage restraint bar positioned beneath said upper stretcher member and at least one member of said pivotable linkage means is attached to said baggage restraint bar.

4. A legrest assembly in accordance with claim 1 wherein said support arms have a generally J-shape where they are pivoted to the seat frame, said pivot connection being made to a bracket attached to said tubular stretcher member at a location behind the stretcher member.

5. A legrest assembly in accordance with claim 1 wherein one end of said extensible cylinder is mounted so that it may move relative to the seat without changing the cylinder length when an overload is applied to the legrest panel while the panel is in its deployed position with the locking means engaged.

6. A legrest assembly in accordance with claim 5 wherein said one end of said cylinder is mounted by means of a fastener in an elongated slot of a bracket carried by the seat frame, said fastener being torqued to a tightness that permits it to slide in said slot under a predetermined load.

7. A legrest assembly in accordance with claim 6 wherein said slot is sufficiently long to accommodate movement of said torqued fastener and to allow said panel to be forced to the floor when a load of at least about 75 pounds is applied to the panel while the panel is deployed and the locking means engaged, said panel being then returnable to its deployed position without damage by applying a similar load while the locking means remains engaged.

8. A legrest assembly in accordance with claim 4 wherein said at least one member of said pivotable linkage means comprises an elongated generally vertical link and said at least one other member comprises a relatively short link which pivotally connects one of the support arms to the upper end of the elongated vertical link, said extensible length cylinder being connected to a lower end portion of said elongated link at a spaced distance from the elongated link's lower pivot point, said cylinder being connected at its upper end to a bracket supported by the seat frame.

9. A legrest assembly in accordance with claim 1 wherein said slide means comprise a pair of slide channels mounted underneath the panel and a pair of slide blocks carried by the support arms, said slide blocks permitting said panel to move by gravity to its outermost position as it is deployed upwardly by the extensible cylinder.

* * * * *